(12) United States Patent (10) Patent No.: US 9,170,779 B2
Cushing (45) Date of Patent: Oct. 27, 2015

(54) MANAGING AN APPLICATION DEVELOPMENT ENVIRONMENT

(75) Inventor: Hugh A. Cushing, New York, NY (US)

(73) Assignee: International Business Machines Corporation, Armonk, NY (US)

(*) Notice: Subject to any disclaimer, the term of this patent is extended or adjusted under 35 U.S.C. 154(b) by 668 days.

(21) Appl. No.: 13/185,964

(22) Filed: Jul. 19, 2011

(65) Prior Publication Data

US 2013/0024834 A1   Jan. 24, 2013

(51) Int. Cl.
G06F 9/44 (2006.01)
(52) U.S. Cl.
CPC ... *G06F 8/20* (2013.01); *G06F 8/71* (2013.01)
(58) Field of Classification Search
USPC .......................................................... 709/229
IPC .................. G06F 8/60,8/36, 17/3023, 17/3056, G06F 17/30286, 8/20, 11/3664
See application file for complete search history.

(56) References Cited

U.S. PATENT DOCUMENTS

| 7,657,866 | B2 | 2/2010 | Cope et al. | |
|---|---|---|---|---|
| 7,661,089 | B2 | 2/2010 | Cope et al. | |
| 2004/0267818 | A1* | 12/2004 | Hartenstine | 707/104.1 |
| 2006/0248205 | A1* | 11/2006 | Randle et al. | 709/229 |
| 2007/0174814 | A1 | 7/2007 | Komissarchik et al. | |
| 2008/0052663 | A1 | 2/2008 | Cope et al. | |
| 2009/0013347 | A1* | 1/2009 | Ahanger et al. | 725/36 |
| 2009/0165002 | A1 | 6/2009 | Sterbenz | |
| 2009/0172636 | A1* | 7/2009 | Griffith et al. | 717/113 |
| 2009/0300619 | A1 | 12/2009 | Hicks et al. | |
| 2010/0008490 | A1* | 1/2010 | Gharachorloo et al. | 379/216.01 |
| 2010/0050156 | A1 | 2/2010 | Bonanno et al. | |
| 2010/0153920 | A1 | 6/2010 | Bonnet | |
| 2010/0275180 | A1 | 10/2010 | Alex | |
| 2011/0191743 | A1* | 8/2011 | Cope et al. | 717/101 |
| 2012/0272205 | A1* | 10/2012 | Fox et al. | 717/101 |
| 2012/0330954 | A1* | 12/2012 | Sivasubramanian et al. | 707/737 |

OTHER PUBLICATIONS

Twiki: AssetMg "Asset Management Scenarios", Open-services.net, archived: Jul. 4, 2009, p. 1-7 <AssetMg_scnr_70409.pdf>.*
Twiki: AssetMg, "Asset Management Specification" (incorporating: Asset Resource Definition, Artifact Resource Definition), Open-services. net, archived: Feb. 5, 2010, p. 1-14 <AssetMgSps_20510.pdf>.*
Kevin Bauer, "Asset Management Specification", AssetMgSpecificationsV1—archived: Feb. 2010, p. 1-14 <AssetMgSps_20510.pdf>.*
Scott Rich, "IBM Rational's Jazz Vision", May 2011, p. 1-37<ScottRich_0511.pdf>.*

* cited by examiner

*Primary Examiner* — Tuan Vu
(74) *Attorney, Agent, or Firm* — Dan Simek; Hoffman Warnick LLC

(57) ABSTRACT

Aspects of the invention provide for managing an application development environment. In one embodiment, aspects of the invention include a computer-implemented method of managing an application development environment, the method including: receiving a request for an application build, wherein the application build has at least one dependency on at least one asset; and processing the request for the application build in response to receiving the request, the processing including: submitting at least one query to an asset management system for at least one asset containing a dependency needed for the build, wherein the asset management system separately manages the plurality of assets apart from the application development environment; and receiving at least one asset from the asset management system in response to submitting at least one query.

8 Claims, 2 Drawing Sheets

MANAGING AN APPLICATION DEVELOPMENT ENVIRONMENT

BACKGROUND OF THE INVENTION

The subject matter disclosed herein relates generally to application development environments. More specifically, the disclosure provided herein relates to managing an application development environment by resolving build dependencies using an asset management system.

The information technology (IT) Infrastructure Library standard is the preeminent standard for the integration of application development and IT operations. This standard defines the concept of a Definitive Software Library (DSL) that addresses quality and auditability issues in software development and deployment. A DSL is an organization's centralized, secure, and governed repository for all software that is used throughout the organization. An organization with a DSL will often-times mandate the use of software within the DSL whenever development or operations requires access to an approved asset (i.e., a software component or product). This ensures that, if the organization is audited, any type of software being used in the organization has been approved through appropriate governance processes, is the version expected to be used from a quality and reliability perspective, and does not raise any legal issues (e.g., viral licensing).

Maven is a known and popular open-source build, test, and deployment solution in the software development arena. It is an application development environment that has a primary objective to simplify the build/test/deploy lifecycle for projects by making many assumptions. One example of these assumptions is when a software dependency is defined in a project. If the dependency has not already been resolved during an earlier application build (i.e., is not already available within a local Maven repository), Maven will attempt to retrieve the software dependency from a remote repository that, by default, is most likely on the public Internet. This can introduce various security, governance, and auditability concerns.

The Open Services for Lifecycle Collaboration (OSLC) initiative is an open non-commercial community that has a mission to specify a common language of web-based services and resources in the software development lifecycle arena. The OSLC initiative has created an Asset Management (AM) specification that provides a standard for managing software assets, specifically including those which are dependencies of other software.

BRIEF DESCRIPTION OF THE INVENTION

Aspects of the invention provide for managing an application development environment. In one embodiment, aspects of the invention include a computer-implemented method of managing an application development environment, the method comprising: receiving a request for an application build, wherein the application build has at least one dependency on at least one asset; and processing the request for the application build in response to receiving the request, the processing including: submitting at least one query to an asset management system for at least one asset containing a dependency needed for the build, wherein the asset management system separately manages the plurality of assets apart from the application development environment; and receiving at least one asset from the asset management system in response to submitting at least one query.

A first aspect of the invention provides a computer-implemented method of managing an application development environment, the method comprising: receiving a request for an application build, wherein the application build has at least one dependency on at least one asset; and processing the request for the application build in response to receiving the request, the processing including: submitting at least one query to an asset management system for at least one asset containing a dependency needed for the build, wherein the asset management system separately manages the plurality of assets apart from the application development environment; and receiving at least one asset from the asset management system in response to submitting at least one query.

A second aspect of the invention provides a computer program comprising program code embodied in at least one computer-readable medium, which when executed, enables a computer system to implement a method of managing an application development environment, the method comprising: receiving a request for an application build, wherein the application build has at least one dependency on at least one asset; and processing the request for the application build in response to receiving the request, the processing including: submitting at least one query to an asset management system for at least one asset containing a dependency needed for the build, wherein the asset management system separately manages the plurality of assets apart from the application development environment; and receiving at least one asset from the asset management system in response to submitting at least one query.

A third aspect of the invention provides a method for deploying an application for managing an application development environment, comprising: providing a computer infrastructure being operable to: receive a request for an application build, wherein the application build has at least one dependency on at least one asset; and process the request for the application build in response to receiving the request, the processing including: submitting at least one query to an asset management system for at least one asset containing a dependency needed for the build, wherein the asset management system separately manages the plurality of assets apart from the application development environment; and receiving at least one asset from the asset management system in response to submitting at least one query.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
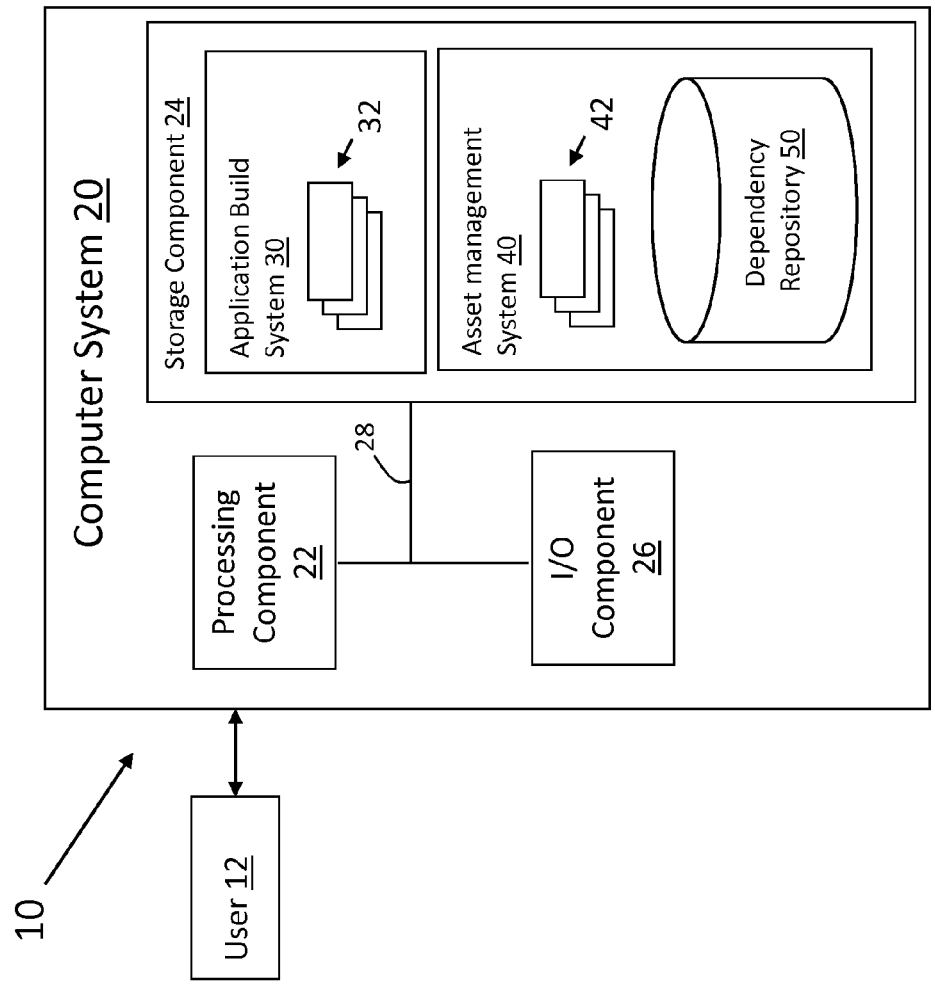
FIG. 1 shows an illustrative environment for managing an application build environment according to an embodiment of the invention.

The subject matter disclosed herein relates generally to application development environments. More specifically, the disclosure provided herein relates to managing an application development environment by resolving build dependencies using an asset management system.

As mentioned above, the information technology (IT) Infrastructure Library standard is the preeminent standard for the integration of application development and IT operations. This standard defines the concept of a Definitive Software Library (DSL) that addresses quality and auditability issues in software development and deployment. A DSL is an organization's centralized, secure, and governed repository for all software that is used throughout the organization. An organization with a DSL will often-times mandate the use of software within the DSL whenever a development or operations team requires access to an approved asset (i.e., a software component or product). This ensures that, if the organization is audited, any type of software being used in the organization has been approved through appropriate governance processes, is the version expected to be used from a quality and reliability perspective, and does not raise any legal issues (e.g., viral licensing).

Maven is a known and popular open-source build, test, and deployment solution in the software development arena. It is an application development environment that has a primary objective to simplify the build/test/deploy lifecycle for projects by making many assumptions. One example of these assumptions is when a software dependency is defined in a project. If the dependency has not already been resolved during an earlier application build (i.e., is not already available within a local Maven repository), Maven will attempt to retrieve the software dependency from a remote repository that, by default, is most likely on the public Internet. This can introduce various security, governance, and auditability concerns.

Several repository managers are available for Maven. A Maven repository manager provides for a managed, centralized repository within an organization, so that Maven will not resolve a software dependency via the public Internet. However, this is not an adequate solution to eliminate governance concerns, largely because such a centralized repository is separate from an organization's Definitive Software Library (DSL).

The Open Services for Lifecycle Collaboration (OSLC) initiative is an open non-commercial community that has a mission to specify a common language of web-based services and resources in the software development lifecycle arena. The OSLC initiative has created an Asset Management (AM) specification that provides a standard for managing software assets, specifically including those which are dependencies of other software.

Aspects of the invention provide for managing an application development environment with an asset management system. In one embodiment, aspects of the invention include a computer-implemented method of managing an application development environment, the method comprising: receiving a request for an application build, wherein the application build has at least one dependency on at least one asset; and processing the request for the application build in response to receiving the request, the processing including: submitting at least one query to an asset management system for at least one asset containing a dependency needed for the build, wherein the asset management system separately manages the plurality of assets apart from the application development environment; and receiving at least one asset from the asset management system in response to submitting at least one query.

Turning to the drawings, FIG. 1 shows an illustrative environment 10 for managing an application build environment according to an embodiment. To this extent, environment 10 includes a computer system 20 that can perform a process described herein in order to manage an application build environment. In particular, computer system 20 is shown including an application build system 30 and an asset management system 40, which makes computer system 20 operable to manage an application build environment by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as an application build system 30 and/or an asset management system 40, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, an application build system 30 and/or an asset management system 40 can manage a set of interfaces (e.g., graphical user interface(s), application program interface, and/or the like) that enable human and/or system users 12 to interact with an application build system 30 and/or an asset management system 40. Further, an application build system 30 and/or an asset management system 40 can manage (e.g., store, retrieve, create, manipulate, organize, present, etc.) the data, such as the data within the dependency repository 50, using any solution.

In any event, computer system 20 can comprise one or more general purpose computing articles of manufacture (e.g., computing devices) capable of executing program code, such as an application build system 30 and/or an asset management system 40, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, an application build system 30 and/or an asset management system 40 can be embodied as any combination of system software and/or application software.

Further, the application build system 30 and/or the asset management system 40 can be implemented using a set of modules 32, 42, respectively. In this case, a module 32, 42 can enable computer system 20 to perform a set of tasks used by the application build system 30 or the asset management system 40, and can be separately developed and/or implemented apart from other portions of the application build system 30 or the asset management system 40. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of the application build system 30 and/or the asset management system 40 fixed thereon (e.g., one or more modules 32, 42). Further, the application build system 30 and the asset management system 40 may be on separate computing devices. However, it is understood that computer system 20 and the application build system 30 and the asset management system 40 are only representative of various possible equivalent computer systems that may perform a process described herein. To this extent, in other embodiments, the functionality provided by computer system 20 and the application build system 30 and the asset management system 40 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described above, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, the application build system 30 and/or the asset management system 40 enables computer system 20 to manage an application development environment. To this extent, the application build system 30 may perform the method illustrated in FIG. 2.

Figure 2:
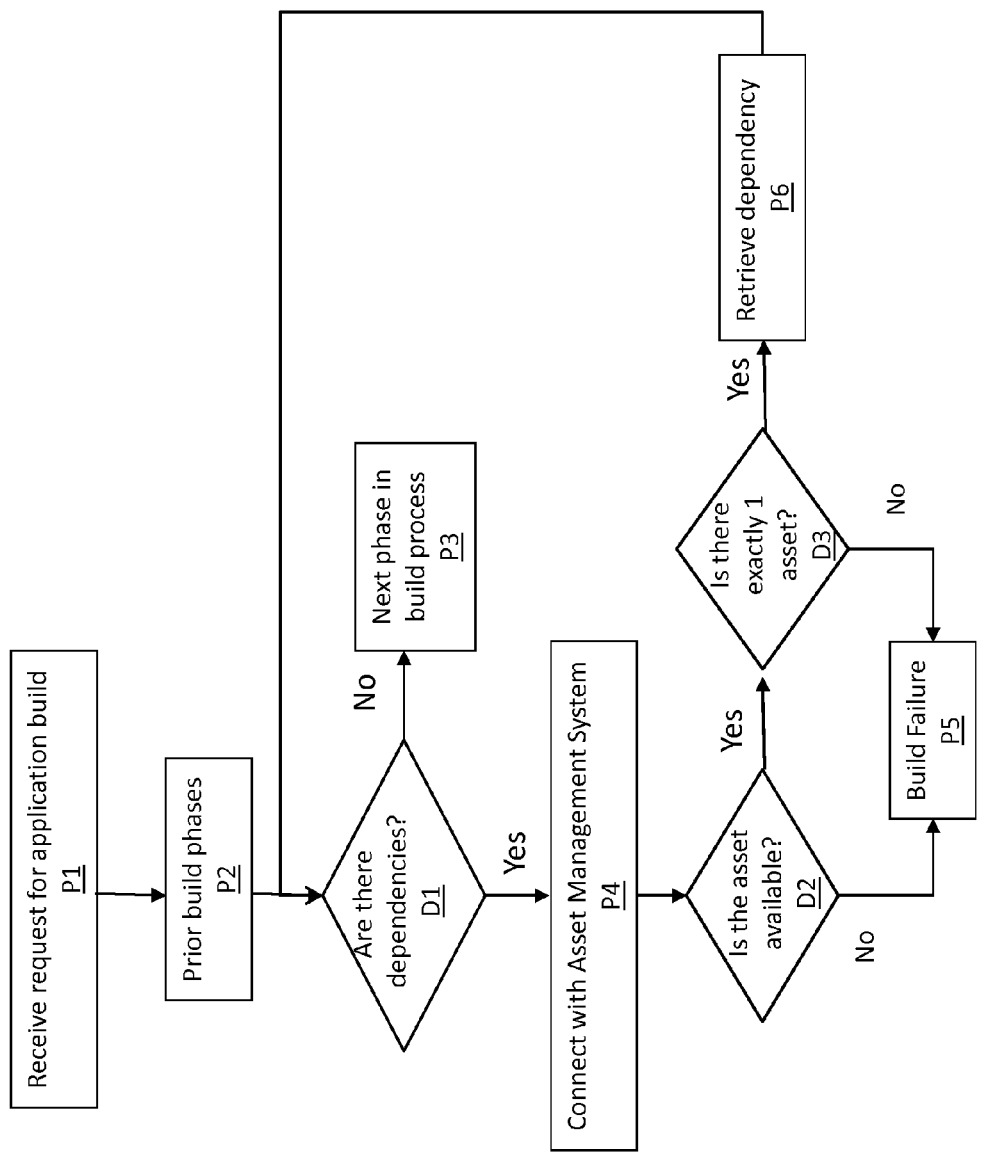
FIG. 2 shows a method flow diagram for managing an application build environment according to an embodiment of the invention.

FIG. 2 shows an illustrative flow diagram depicting a method according to embodiments of the invention. The method according to embodiments of the invention is performed by the environment 10 in FIG. 1. Referring now to FIGS. 1 and 2, at process P1, a request for an application build is received by the application build system 30. The application build system 30 may be any now known or later developed application development environment, such as, Maven. After a request for an application build is received, at process P2, any prior phases of the build process will execute, if any.

In any case, at decision D1, the request for the application build is processed, by determining whether there are any dependencies required for the application build. For example, in the Maven application development environment, dependencies would be declared within the Maven Project Object Model (POM) file, which is a file that defines the build and deploy process for a particular development project. An asset for the dependency may be, for example, a Java JAR file. If there are no dependencies required for the application build (No, D1), the process will proceed to other phases in the build process, such as the compile phase (process P3).

At process P4, if there are dependencies required for the application build (Yes, D1), the application build system 30 will connect with the asset management system 40. The asset management system 40 complies with any now known or later developed asset management protocol, such as, an Open Services for Lifecycle Collaboration (OSLC) protocol. In the case that the asset management system 40 complies with OSLC protocol, the connection is made by requesting from the asset management system 40 the OSLC-compliant service definitions and the asset management system 40 returning the OSLC-compliant service definitions.

At decision D2, the application build system 30 will submit a query to the asset management system 40 to determine if the asset for the dependency is available in the asset management system 40, that is, within a storage component 50, the dependency repository 50, of the asset management system 40. If the asset for the dependency is not available in the dependency repository 50 of the asset management system 40 (No, D2), at process P5, there will be a build failure (process P5).

At decision D3, if the asset for the dependency is available in the dependency repository 50 of the asset management system 40 (Yes, D2), the asset management system 40 will determine if there is exactly one asset for that dependency, as determined by the query submitted to the asset management system 40. If the query returns more than one asset in the dependency repository 50 of the asset management system 40 (No, D3), there will be a build failure (process P5).

At process P6, if there is exactly one asset for that dependency within the dependency repository 50 of the asset management system 40 (Yes, D3), the dependency is retrieved from the contents of the asset from the asset management system 40. If the embodiment of an application build system includes Maven, the dependency may be saved within a local Maven repository. The application build system 30 then returns to decision D1 to determine if there are other dependencies required for the application build. Once there are no more dependencies for the application build (No, D1), at process P2, the application build system 30 will move on to other phases in the build and development process, such as, but not limited to the compile phase.

Using the method described herein with respect to FIGS. 1 and 2, allows for build dependencies that can be subject to all the governance and security restrictions enforced by the asset management system 40 implementing an asset management protocol, such as the OSLC protocol, for the dependencies within the dependency repository 50.

While shown and described herein as a method and system for managing an application build environment, it is understood that aspects of the invention further provide various alternative embodiments. For example, in one embodiment, the invention provides a computer program fixed in at least one computer-readable medium, which when executed, enables a computer system to manage an application build environment. To this extent, the computer-readable medium includes program code, such as an application build system 30 (FIG. 1) and/or an asset management system 40 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as an application build system 30 (FIG. 1) and/or an asset management system 40 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing an application build environment. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to manage an application build environment as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of managing an application development environment, the method comprising:
   receiving a request for an application build, wherein the application build has at least one dependency on at least one asset; and
   processing the request for the application build in response to receiving the request, the processing including:
      submitting a query to an asset management system for an asset containing a dependency needed for the build, the asset management system being a definitive software library external to and in communication with the application development environment, wherein the asset management system separately manages a plurality of assets apart from the application development environment via an Open Services for Lifecycle Collaboration-compliant (OSLC-compliant) asset management protocol, includes a plurality of archived implementations in a local Maven dependency repository, and is inaccessible via public internet; and
      in response to submitting the query:
         generating a build failure, pursuant to the OSLC-compliant asset management protocol, in response to the asset management system indicating more than one asset matching the query is available from the asset management system;
         generating a build failure, pursuant to the OSLC-compliant asset management protocol, in response to the asset management system indicating no asset matching the query is available from the asset management system; and
      in response to the asset management system indicating exactly one asset matching the query is available from the asset management system:
         retrieving a dependency for the one asset from the local Maven dependency repository of the asset management system, the dependency being subject to a governance restriction and a security restriction in the OSLC-compliant asset management protocol for the asset management system;
         continuing the application build, wherein the continuing includes:
            importing at least one archived implementation from the plurality of assets into the application build in a first phase, the at least one archived implementation being saved within the local Maven dependency repository;
            modifying the application build with the imported at least one archived implementation from the local Maven dependency repository based on a user input in a second phase; and
            compiling the modified application build in a third phase.

2. The computer-implemented method of claim 1, further comprising connecting with the asset management system prior to submitting the query.

3. The computer-implemented method of claim 1, wherein the asset is a Java JAR file.

4. A computer program comprising program code embodied in at least one non-transitory computer-readable medium, which when executed, enables a computer system to implement a method of managing an application development environment, the method comprising:
   receiving a request for an application build, wherein the application build has at least one dependency on at least one asset; and
   processing the request for the application build in response to receiving the request, the processing including:
      submitting a query to an asset management system for an asset containing a dependency needed for the build, the asset management system being a definitive software library external to and in communication with the application development environment, wherein the asset management system separately manages a plurality of assets apart from the application development environment via an Open Services for Lifecycle Collaboration-compliant (OSLC-compliant) asset management protocol, includes a plurality of archived implementations in a local Maven dependency repository, and is inaccessible via public internet; and in response to submitting the query:
generating a build failure, pursuant to the OSLC-compliant asset management protocol, in response to the asset management system indicating more than one asset matching the query is available from the asset management system;
generating a build failure, pursuant to the OSLC-compliant asset management protocol, in response to the asset management system indicating no asset matching the query is available from the asset management system; and
in response to the asset management system indicating exactly one asset matching the query is available from the asset management system:
retrieving a dependency for the one asset from the local Maven dependency repository of the asset management system, the dependency being subject to a governance restriction and a security restriction in the OSLC-compliant asset management protocol for the asset management system; and
continuing the application build, wherein the continuing includes:
importing at least one archived implementation from the plurality of assets into the application build in a first phase, the at least one archived implementation being saved within the local Maven dependency repository;
modifying the application build with the imported at least one archived implementation based on a user input in a second phase; and
compiling the modified application build in a third phase.

5. The computer program of claim 4, further comprising connecting with the asset management system prior to submitting the query.

6. The computer program of claim 4, wherein the asset is a Java JAR file.

7. A method for deploying an application for managing an application development environment, comprising:
providing a computer infrastructure being operable to:
receive a request for an application build, wherein the application build has at least one dependency on at least one asset; and
process the request for the application build in response to receiving the request, the processing including:
submitting a query to an asset management system for an asset containing a dependency needed for the build, the asset management system being a definitive software library external to and in communication with the application development environment, wherein the asset management system separately manages a plurality of assets apart from the application development environment via an Open Services for Lifecycle Collaboration-compliant (OSLC-compliant) asset management protocol, includes a plurality of archived implementations in a local Maven dependency repository, and is inaccessible via public internet; and
in response to submitting the query:
generating a build failure, pursuant to the OSLC-compliant asset management protocol, in response to the asset management system indicating more than one asset matching the query is available from the asset management system;
generating a build failure, pursuant to the OSLC-compliant asset management protocol, in response to the asset management system indicating no asset matching the query is available from the asset management system; and
in response to the asset management system indicating exactly one asset matching the query is available from the asset management system:
retrieving a dependency for the one asset from the local Maven dependency repository of the asset management system, the dependency being subject to a governance restriction and a security restriction in the OSLC-compliant asset management protocol for the asset management system; and
continuing the application build, wherein the continuing includes:
importing at least one archived implementation from the plurality of assets into the application build in a first phase, the at least one archived implementation being saved within the local Maven dependency repository;
modifying the application build with the imported at least one archived implementation from the local Maven dependency repository based on a user input in a second phase; and
compiling the modified application build in a third phase.

8. The method of claim 7, wherein the asset is a Java JAR file.

* * * * *